United States Patent
Pekarek et al.

(10) Patent No.: US 12,498,211 B2
(45) Date of Patent: Dec. 16, 2025

(54) TECHNIQUES FOR COMPENSATING FOR ERRORS IN AN OPTICAL INTERFEROMETER SYSTEM

(71) Applicant: Honeywell International Inc., Charlotte, NC (US)

(72) Inventors: Jan Pekarek, Brno (CZ); Zbynek Drasal, Prague (CZ); Lucas N. Taylor, Minneapolis, MN (US); Robert Mark, Minnetonka, MN (US); Mikulas Jandak, Kolˆˆn (CZ)

(73) Assignee: Honeywell International Inc., Charlotte, NC (US)

( * ) Notice: Subject to any disclaimer, the term of this patent is extended or adjusted under 35 U.S.C. 154(b) by 149 days.

(21) Appl. No.: 18/433,996

(22) Filed: Feb. 6, 2024

(65) Prior Publication Data
US 2025/0251233 A1    Aug. 7, 2025

(51) Int. Cl.
   *G01B 9/02055*   (2022.01)
   *G01S 7/481*     (2006.01)
   *G01S 17/931*    (2020.01)

(52) U.S. Cl.
   CPC ........ *G01B 9/02072* (2013.04); *G01S 7/4816* (2013.01); *G01S 7/4818* (2013.01); *G01S 17/931* (2020.01); *G01B 2290/25* (2013.01)

(58) Field of Classification Search
   CPC ............ G01B 9/02072; G01B 2290/25; G01S 7/4816; G01S 7/4818; G01S 17/931; G01S 17/58; G01S 7/4813; G01S 7/4812
   See application file for complete search history.

(56) References Cited

U.S. PATENT DOCUMENTS

| | | | |
|---|---|---|---|
| 7,106,447 B2 | 9/2006 | Hays | |
| 9,279,724 B2 * | 3/2016 | Robinson | G01J 3/0202 |
| 10,746,593 B2 | 8/2020 | Mochizuki et al. | |
| 11,168,979 B2 * | 11/2021 | Chaudhuri | G01B 9/02039 |
| 11,239,626 B2 | 2/2022 | Hunter et al. | |
| 2002/0167670 A1 | 11/2002 | Baney et al. | |
| 2020/0412093 A1 | 12/2020 | Kischkat | |

FOREIGN PATENT DOCUMENTS

| | | |
|---|---|---|
| CN | 204631247 U | 9/2015 |
| JP | 2004010551 A1 | 1/2004 |
| JP | 2008111863 A | 5/2008 |
| KR | 101208109 B1 | 12/2012 |

OTHER PUBLICATIONS

European Patent Office, "Extended European Search Report", dated Jul. 8, 2025, from EP Application No. 25151743.9, from Foreign Counterpart to U.S. Appl. No. 18/433,996, pp. 1 through 9, Published: EP.

* cited by examiner

*Primary Examiner* — Seung C Sohn
(74) *Attorney, Agent, or Firm* — Fogg & Powers LLC

(57) ABSTRACT

Techniques are provided for symmetrically locating optical emitters in a surface of a ferrule. Such symmetrical displacement of each pair of optical emitters diminishes differences in path lengths through which optical signals propagate in an optical interferometer with tilted input and/or output surfaces.

20 Claims, 7 Drawing Sheets

TECHNIQUES FOR COMPENSATING FOR ERRORS IN AN OPTICAL INTERFEROMETER SYSTEM

BACKGROUND

A light or laser detection and ranging (LIDAR) system may be used in an aircraft for determining one or more state variables of the aircraft including for example, speed, rate of climb or decent, angle of attack, and/or angle of sideslip. A LIDAR system may use an optical interferometer system configured to form and project an optical interference pattern on an optical detector of the optical interferometer system. Velocity may be derived from the interference pattern detected by the optical detector, for example, using techniques described in U.S. Pat. No. 7,106,447. U.S. Pat. No. 7,106,447 is incorporated herein by reference in its entirety.

The optical interferometer system includes a ferrule and optical processing components such as lenses, an optical detector, optionally optical filters, and a Fabry-Perot etalon. The Fabry-Perot etalon includes first and second optically clear components which are separated, e.g., by free space. An input surface, of the first optically clear component, is configured to receive a Fabry-Perot etalon input optical signal from a first external component. An output surface, of the second optically clear component, is configured to emit a Fabry-Perot etalon output optical signal. Each of the input and the output surfaces are tilted around a first (e.g., X) axis and offset at angle with respect to a second (e.g., Y) axis which is orthogonal to the first axis. The first and the second axes are each orthogonal to a third (e.g., Z) axis along which or in parallel with both the etalon input and the etalon output optical signals propagate.

Due to the separation between the first and second optically clear components, the Fabry-Perot etalon output optical signal generates a desired interference pattern which is emitted as the output optical signal. The input surface and the output surface are tilted to diminish undesired optical effects.

Typically, three or more transmitted optical signals are each emitted to a different region outside of the aircraft. Hence, vector variable(s) may be determined.

Conventionally, the three or more reflected optical signals and a single reference optical signal are emitted from a conventional ferrule. The reference optical signal is derived from an optical light source, e.g., a laser, configured to provide the three or more transmitted optical signal. A reflected optical signal is a portion of an emitted optical signal reflected from a region outside the aircraft and subsequently received by the LIDAR system. The reference optical signal and each reflected optical signal are separately projected from different locations on the ferrule to the input surface of the Fabry-Perot etalon. As a result, the Fabry-Perot etalon projects interference patterns (which are separate Fabry-Perot etalon output optical signals) at the same relative locations of the reference optical signal and each reflected optical signal.

To derive a velocity projection corresponding to a direction of a reflected optical signal, the interference pattern emitted at a relative location of the reflected optical signal is compared with the interference pattern emitted at the relative location of the reference optical signal. The tilted input and output surfaces of the Fabry-Perot etalon cause a path length of each reflected optical signal through the Fabry-Perot etalon and a path length of the reference optical signal through the Fabry-Perot etalon to differ. As a result of such differing path lengths, velocity projection calculations by the LIDAR system may be erroneous.

SUMMARY

In some aspects, the techniques described herein relate to an apparatus for transmitting optical signals to an input surface of an optical interferometer, wherein the optical interferometer further includes an output surface, wherein the input surface is tilted around a first axis and offset at a first angle with respect to a second axis which is orthogonal to the first axis, wherein the output surface is tilted around the first axis and offset at a second angle with respect to the second axis which is orthogonal to the first axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the apparatus including: a ferrule; N pairs of optical emitters in a surface of the ferrule, wherein each pair of optical emitters includes a received optical emitter configured to emit to the input surface a received optical signal and a reference optical emitter configured to emit to the input surface a reference optical signal, wherein N is an integer greater than zero; wherein the surface of the ferrule is in a plane formed by a fourth and a fifth axis which are orthogonal to one another; and wherein cross-sections of the optical emitters of each pair are symmetrically disposed around the fifth axis; wherein, for each pair, the received optical emitter is in a half of the plane divided by the fifth axis and the reference optical emitter is in another half of the plane.

In some aspects, the techniques described herein relate to a method for transmitting optical signals to an input surface of an optical interferometer, wherein the optical interferometer further includes an output surface, wherein the input surface is tilted around a first axis offset at a first angle with respect to a second axis which is orthogonal to the first axis, wherein the output surface is tilted around the first axis offset at a second angle with respect to the second axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the method including: receiving N received optical signals, wherein N is an integer greater than or equal to one; receiving M reference optical signals, wherein M is an integer less than or equal to O, and wherein O is an integer greater than or equal to N; and emitting N pairs of a received optical signal and a reference optical signal, wherein cross-sections of optical signals of each pair of the N pairs are symmetrically emitted around a fifth axis of a plane in which each emitter is located and which is defined by a fourth axis and the fifth axis that are orthogonal to one another.

In some aspects, the techniques described herein relate to an apparatus for transmitting optical signals to an input surface, of a Fabry-Perot etalon, which is tilted around a first axis and offset at a first angle with respect to a second axis which is orthogonal to the first axis, wherein optical signal is configured to propagate in a third axis, orthogonal to each of the first and the second axes, to the input surface of the Fabry-Perot etalon, the apparatus including: a first set of N optical emitters each of which emit a reflected optical signal from a ferrule surface, wherein N is an integer greater than zero; a second set of O optical emitters each of which emit a reference optical signal from the ferrule surface, wherein O is an integer greater than or equal to N; and wherein the ferrule surface is in a plane formed by fourth and fifth axes; wherein a position of each pair of an optical emitter of the first set and an optical emitter of the second set are symmetrically disposed around the fifth axis.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
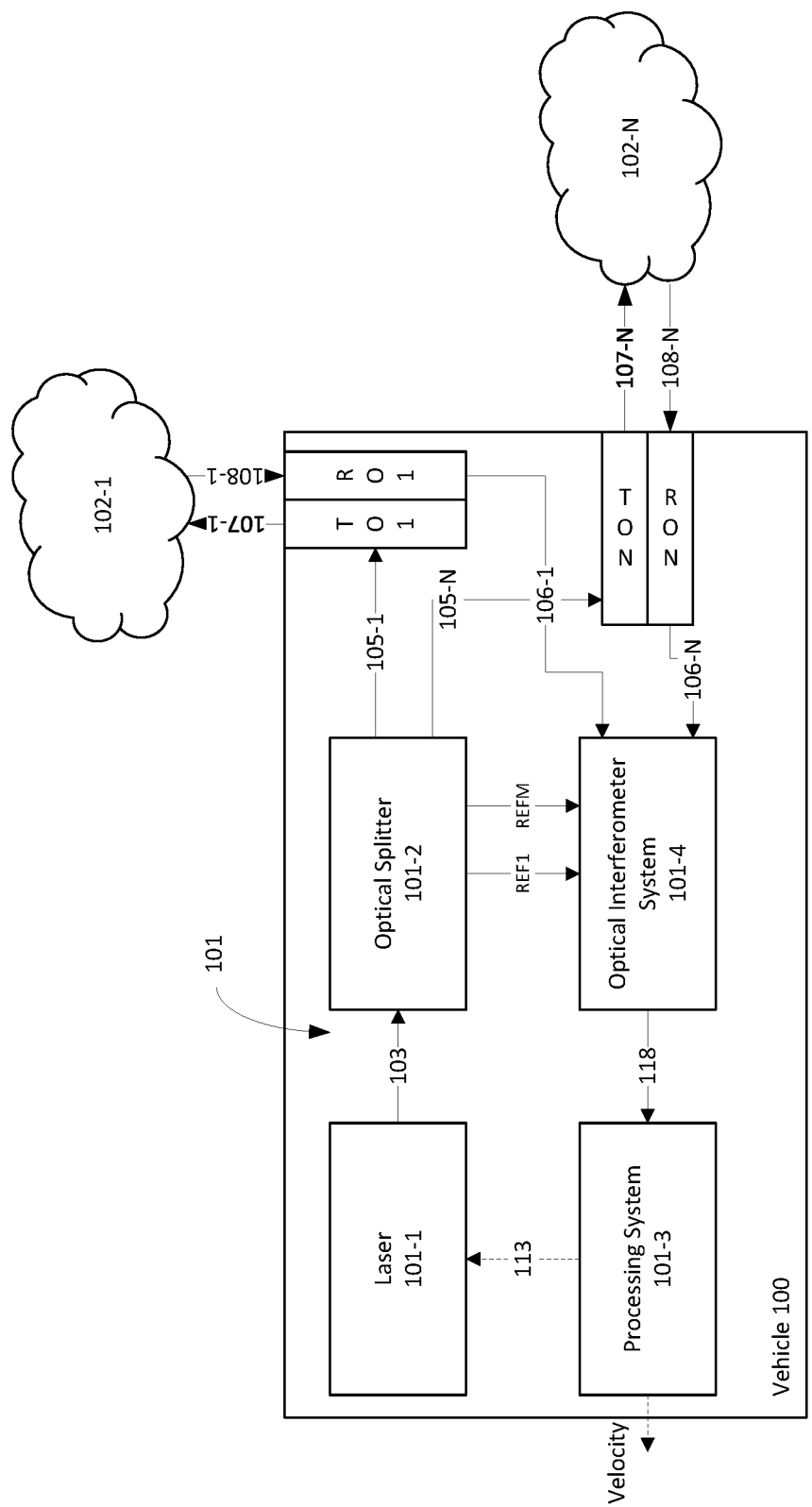
FIG. 1 illustrates a block diagram of one embodiment of a vehicle including a LIDAR system utilizing a ferrule according to embodiments of the invention.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

For pedagogical purposes, embodiments of the invention are described with respect to an optical interferometer system of a LIDAR system. However, embodiments of the invention may be used in other applications. The optical spectrum includes the ultraviolet, visible, and infrared spectrums.

Embodiments of the invention diminish the aforementioned sources of error, e.g., in a LIDAR system including an optical interferometer system are as follows. In the ferrule, each reflected signal optical emitter is paired with a reference signal emitter whose position in the ferrule is unique with respect to a position of a corresponding reflected signal optical emitter. Each pair of a reflected signal optical emitter and a reference signal optical emitter are symmetrically disposed around an axis defining a plane of a surface of the ferrule; optionally, each of such emitters also have a same cross-section.

FIG. 1 illustrates a block diagram of one embodiment of a vehicle 100 including a LIDAR system 101 utilizing a ferrule according to embodiments of the invention. The LIDAR system 101 is mounted on and/or in the vehicle 100. The vehicle 100 may be an airborne vehicle (e.g., an aircraft), a spaceborne vehicle, a terrestrial vehicle, a waterborne vehicle, or any other type of vehicle.

The LIDAR system 101 includes a laser 101-1, an optical splitter 101-2, one or more pairs of transmitting optical components and receiving optical components TO1, RO1 and TON, RON, an optical interferometer system 101-4 including the ferrule according to embodiments of the invention, and a processing system 101-3. The processing system 101-3 optionally comprises at least one processor circuit and at least one memory circuit. Optionally, the processing system is configured to determine a velocity, e.g., a vector velocity, of the vehicle 100 by analyzing interference patterns received from the optical interferometer system 101-4. Exemplary techniques for doing so are described in U.S. Pat. No. 7,106,447. Optionally, the processing system 101-3 is further configured to control a power level of the laser 101-1 using a control signal 113 and based on information in electrical signals 118 representing an optical intensity of a total optical interference pattern.

The laser 101-1 is configured to transmit an optical signal 103 to the optical splitter 101-2. The optical splitter 101-2 is configured to provide each of N transmission optical signals 105-1, 105-N to a unique one of N transmitting optical components TO1, TON. N is an integer greater than or equal to one.

FIG. 1 illustrates for pedagogical purposes that the optical splitter 101-2 is further configured to provide each of M reference signals REF1, REFM to the optical interferometer system 101-4. M is an integer less than or equal to O, e.g., less than or equal to N, and greater than zero. Optionally, if less than O reference optical signals are received from the optical splitter 101-2, then the at least one reference optical signal is split so that O reference optical signals are provided to the optical interferometer system 101-4.

M equals one and the optical splitter 101-2 provides a single reference signal to the optical interferometer system 101-4, and the optical interferometer system 101-4, e.g., an optional optical splitter in the optical interferometer system 101-4, e.g., the ferrule therein, may split the single reference signal into O reference signals. O is an integer greater or equal to N; reference signals in excess of N reference signals may be used for purposes other than those described herein.

Each of the N transmitting optical components TO1, TON is paired with a unique one of the N receiving optical components RO1, RON. Each of the N transmitting optical components TO1, TON comprises at least one optical lens and/or at least one optical mirror. Each of the N transmitting optical components TO1, TO2 is configured to, using a transmission optical signal, emit a transmitted optical signal 107-1, 107-N.

Each of the N transmitted optical signals are emitted towards a region 102-1, 102-N, impinging upon the region 102-1, 102-N, and is scattered by components, e.g., molecules, particulates, etc., of a region 102-1, 102-N around the vehicle 100. Each region may be a spatial volume and may be formed by at least one gas, at least one solid, and/or at least one liquid. A portion of each transmitted optical signal, a reflected optical signal 108-1, 108-N, is reflected back to a corresponding receiving optical component RO1, RON; optionally, such receiving optical component RO1, RON is adjacent to a transmitting optical component TO1, TON which transmitted the transmitted optical signal 107-1, 107-N whose reflected portion is received by the receiving optical component RO1, RON. Each of the N receiving optical components RO1, RON includes at least one lens and/or at least one mirror.

Each of the N receiving optical components RO1, RON is configured to provide a received optical signal 106-1, 106-N to the optical interferometer system 101-4, e.g., a ferrule therein. Each of the N received optical signals 106-1, 106-N is derived by a unique receiving optical component from a unique reflected optical signal.

Figure 2:
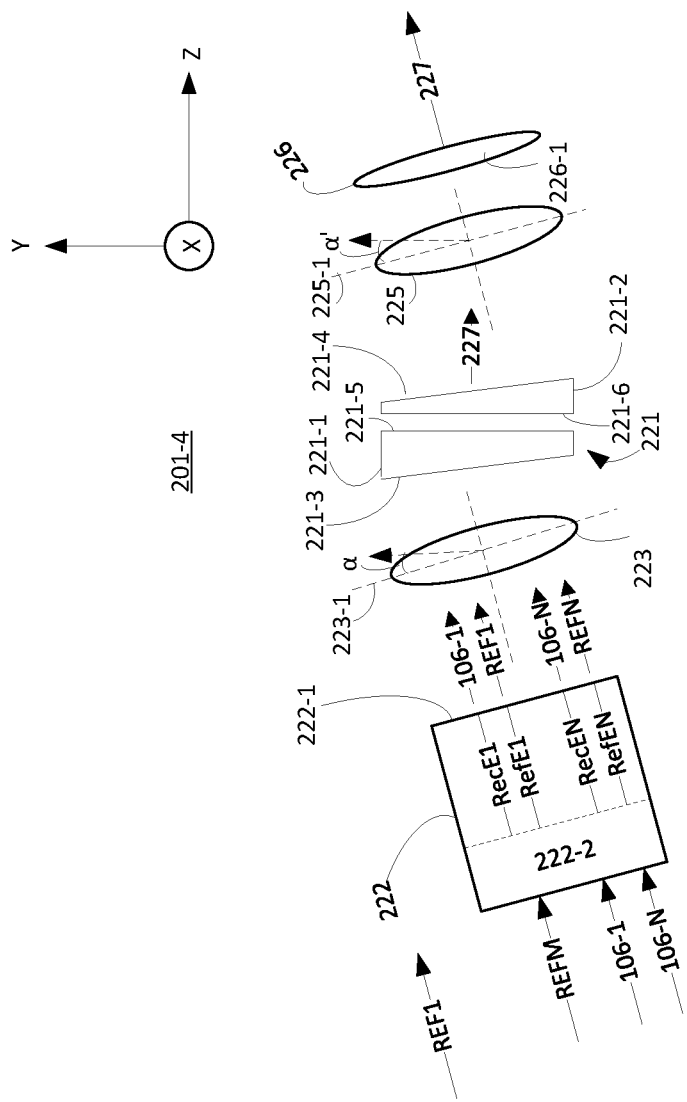
FIG. 2 illustrates a diagram of one embodiment of an optical interferometer system including a ferrule according to embodiments of the invention.

FIG. 2. illustrates a diagram of one embodiment of an optical interferometer system 201-4 including a ferrule 222 according to embodiments of the invention. The illustrated optical interferometer system 201-4 includes the ferrule 222, at least one collimating lens 223, an optical interferometer 221, at least one imaging lens 225, and an optical sensor 226. The optical sensor 226 is configured to generate the electrical signals 118 representing an optical intensity of a total optical interference pattern.

The ferrule 222 is configured to receive the N received optical signals 106-1, 106-N and the M reference optical signals REF1, REFM. Optionally, M equals O. If M is less than N, then the ferrule 222 may be combined with or include an optical splitter 222-2 configured to provide O reference optical signals from the M reference optical signals REF1, REFM. O is an integer equal to or greater than N. When O is greater than N, then the extra reference optical signals in excess of N reference optical signals may be used for other purposes in the optical interferometer system 101-4.

The ferrule 222 includes a set of N receive optical emitters RecE1, RecEN each of which is configured to emit a unique received optical signal 106-1, 106-N toward an input surface 221-3 of the optical interferometer 221. The ferrule 222 also includes a set of O reference optical emitters RefE1, RefE1 each of which is configured to emit a unique reference optical signal REF1, REFN to the input surface 221-3 of the optical interferometer 221. Optionally, a ferrule surface 222-1 of the ferrule 222 and each vertical axis 223-1 of each of the at least one collimating lenses 223 may be tilted around the first, e.g., X, axis at an angle α with respect to the second, e.g., Y, axis (orthogonal to the first axis)[1]; the first and second interior surfaces 221-5, 221-6 are parallel with one another. The at least one collimating lens 223 is configured to collimate the N received optical signals and the N reference signals emitted by the ferrule 222 prior to their becoming incident upon the input surface 221-3 of the optical interferometer 221.

[1] Such that an optical axis through an intersection 445 of a fourth axis 441 and a fifth axis 442 (illustrated in FIG. 4.) is orthogonal to first and second interior surfaces 221-5, 221-6 of the optical interferometer 221.

The optical interferometer 221 includes a first piece of optically clear material 221-1 and a second piece of optically clear material 221-2 which are separated, e.g., by free space, air, etc. The first piece of optically clear material 221-1 includes a first interior surface 221-5, and the input surface 221-3 which is configured to receive the N received optical signals and the N reference signals collimated by and emitted by the at least one collimating lens. The second piece of optically clear material 221-2 includes a second interior surface 221-6, and an output surface 221-4 configured to emit interference patterns formed by the optical interferometer 221 of each of the N received optical signals and the N reference signals.

All of such interference patterns are referred to as total optical interference pattern 227 and are configured to be emitted from the output surface 221-4. Each piece of the optically clear material may be glass, quartz, or any other material which is optically clear at a wavelength of the optical signal 103 emitted by the laser 101-1.

Figure 3:
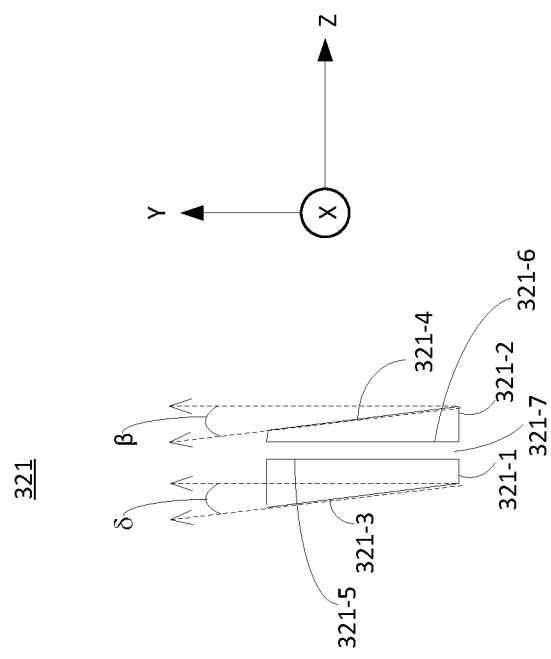
FIG. 3 illustrates a diagram of one embodiment of an optical interferometer according to embodiments of the invention.

FIG. 3 illustrates a diagram of one embodiment of an optical interferometer 321 according to embodiments of the invention. The optical interferometer 221, 321 illustrated in FIGS. 2 and 3 is a Fabry-Perot interferometer. However, the optical interferometer 321 may be any optical interferometer including the first piece of optically clear material 321-1 separated by a third piece of optically clear material 321-7 (e.g., air or a vacuum) from a second piece of optically clear material 321-2 and having at least one of (a) the input surface 321-3 of the first piece of optically clear material 321-1 which is tilted around a first (e.g., X) axis and offset at angle δ with respect to a second (e.g., Y) axis which is orthogonal to the first axis and (b) the output surface 321-4 of the second piece of optically clear material 321-2 which is tilted around a first (e.g., X) axis and offset at angle β with respect to a second (e.g., Y) axis which is orthogonal to the first axis. Optionally, offset angle β is equal to offset angle δ, however, such offset angles may differ. The first and the second axes are each orthogonal to a third (e.g., Z) along which or parallel to which the received and reference optical signals and the total optical interference pattern (and its constituent components) propagate. The first piece of optically clear material 321-1 includes an input surface 321-3 and a first interior surface 321-5. The second piece of optically clear material 321-2 includes an output surface 321-4 and a second interior surface 321-6.

Returning to FIG. 2, the total optical interference pattern 227 is transmitted from the output surface 221-4 to at least one imaging lens 225 which is configured to focus the total optical interference pattern 227 on the optical sensor 226.

Optionally, both the sensor surface 226-1 of the optical sensor 226 and a vertical axis 225-1 of each of the at least one focusing lenses 225 may be both tilted around the first, e.g., X, axis at an angle α' with respect to the second, e.g., Y, axis (orthogonal to the first axis) so that the total optical interference pattern 227 is transmitted orthogonally from the first and the second interior surfaces 221-5, 221-6 of the optical interferometer 221. Optionally, angle α' equals angle α', however, both angles may differ.

The optical sensor 226 may be complementary metal oxide semiconductor (CMOS) sensor, a charged coupled device (CCD) sensor, or any other type of optical sensor. The optical sensor 226 converts the total optical interference pattern 227 to electricals signal conveying information about (or representative of) the total optical interference pattern 227 including its constituent interference patterns described elsewhere herein. A surface 226-1 of the optical sensor 226 upon which the total optical interference pattern 227 is incident may or may not be parallel to a surface formed by the first and the second axes and is orthogonal to the third axis.

Figure 4:
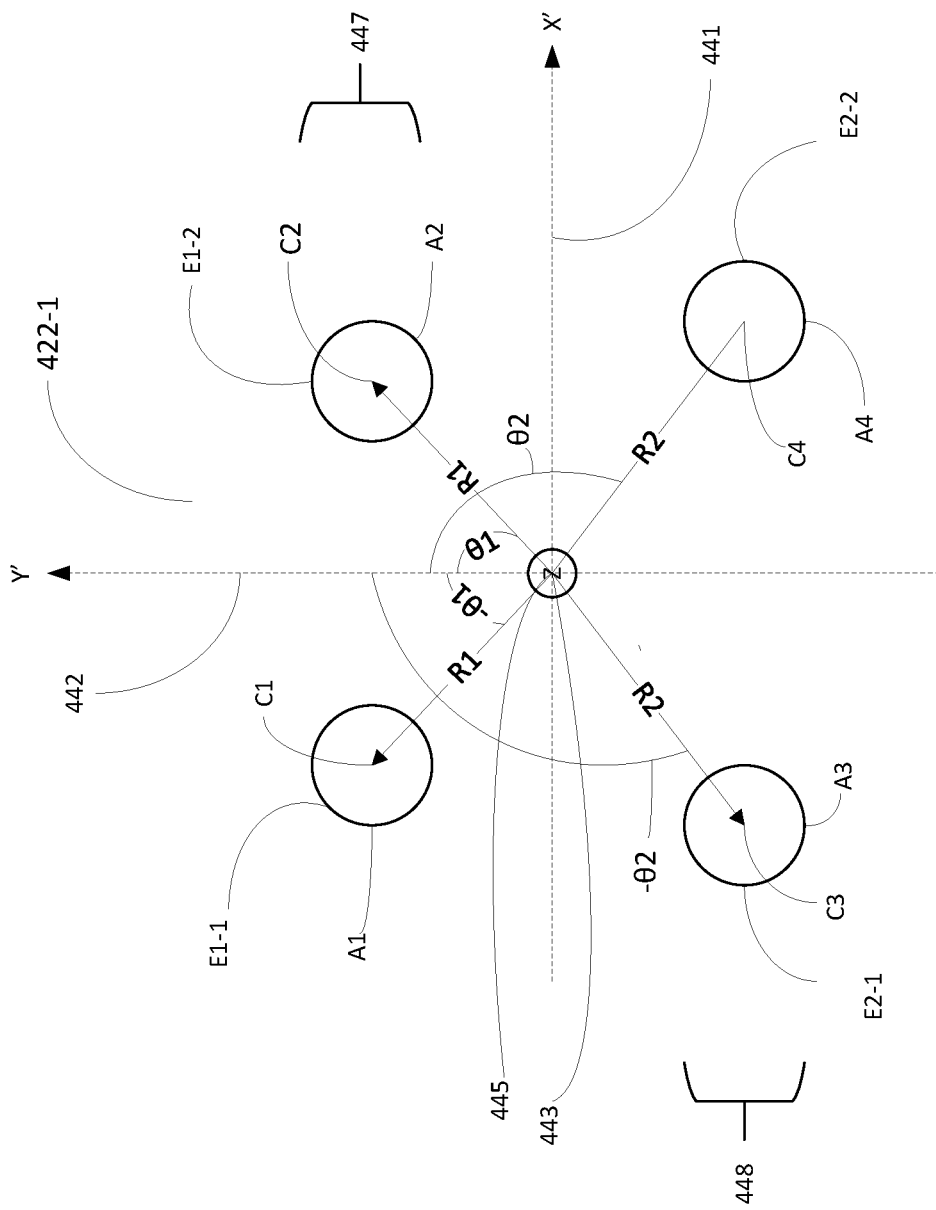
FIG. 4 illustrates one embodiment of a surface, of the ferrule, at which an end of each optical emitter is optically visible.

FIG. 4 illustrates one embodiment of a surface 422-1, of the ferrule, at which an end of each optical emitter is optically visible (i.e., at the wavelength of the optical signal 103 emitted by the laser 101-1). For pedagogical purposes, the emitters are illustrated as having a circular cross-section; however, in other embodiments, an emitter may have a different cross-section, e.g., an ellipsoidal or a rectangular cross-section. N pairs of emitters are at the surface 422-1. Each pair of optical emitters includes a unique receive optical emitter (RecE1 or RecEN) and a unique reference optical emitter (respectively RefE1 or RefEN) whose positions are symmetrically disposed around the fifth axis 442 (e.g., the Y' axis)[2]; optionally, each such emitters have a same cross-section. Such symmetrical displacement of positions of each pair of optical emitters diminishes differences in path lengths through which optical signals propagate in an optical interferometer with tilted input and/or output surfaces described elsewhere herein.

[2] The fourth axis 441 and the fifth axis 442 intersect at an intersection 445 such that the fourth axis 441 divides, e.g., symmetrically, the surface 222-1 of the ferule 222 along the fourth axis 441 and the fifth axis 442 divides, e.g., symmetrically, the surface 222-1 of the ferule 222 along the fifth axis 442. The fourth and the fifth axes 441, 442 are axes which define a plane of the surface 422-1.

Such symmetry may be described in many different ways. For pedagogical purpose, such symmetry will be described as follows; however, the following description is not meant to be limiting. Further, for pedagogical purposes, FIG. 4 illustrates a number of pairs of optical emitters N equals two. However, embodiments of the invention are applicable when a number a number of pairs of optical emitter pairs N is greater than or equal to one.

A first pair 447 of optical emitters E1-1, E1-2 includes a first optical emitter (e.g., either a first receive optical emitter RecE1 or a first reference optical emitter RefE1) and a second optical emitter (e.g., respectively either the first reference optical emitter RefE1 or the first receive optical emitter RecE1). A center[3] C1 of the first optical emitter E1-1 is disposed at a negative first angle $-\theta 1$ from the fifth axis 442 and at a first radius R1 from the intersection 445 of the fourth (X') and fifth (Y') axes 441, 442. A center C2 of the second optical emitter E1-2 is disposed at a first angle $\theta 1$ from the fifth axis 442 and at the first radius R1 from the intersection 445 of the fourth and fifth axes 441, 442.

[3] The centers described herein are geometric centers.

A second pair 448 of optical emitters E2-1, E2-2 includes a third optical emitter (e.g., either a Nth receive optical emitter RecEN or a Nth reference optical emitter RefEN) and a fourth optical emitter (e.g., respectively either the Nth reference optical emitter RefEN or the Nth receive optical emitter RecEN). A center C3 of the third optical emitter E2-1 is disposed at a negative second angle $-\theta 2$ from the fifth axis 442 and at a second radius R2 from the intersection 445 of the fourth and fifth axes 441, 442. A center C4 of the second optical emitter E2-2 is disposed at a second angle $\theta 2$ from the fifth axis 442 and at the second radius R2 from the intersection 445 of the fourth and fifth axes 441, 442.

Each of the fourth and fifth axes 441, 442 are orthogonal to a sixth axis 443 (e.g., the Z' axis). The aforementioned symmetrical disposition of positions, about the fifth axis 442, of a receive optical emitter and reference optical emitter of each pair 447, 448 diminishes the difference between a path length of a reflected optical signal, emitted by the receive optical emitter, through the Fabry-Perot etalon and a path length of a reference optical signal, emitted by the reference optical emitter, through the above described optical interferometer 221. As a result, for example, the above described error in velocity measurements by the LIDAR system 101 is reduced.

Each optical emitter E1-1, E1-2 of the first pair has a cross-sectional area A1, A2. Each optical emitter E2-1, E2-2 of the second pair has a cross-sectional area A3, A4.

Figure 5:
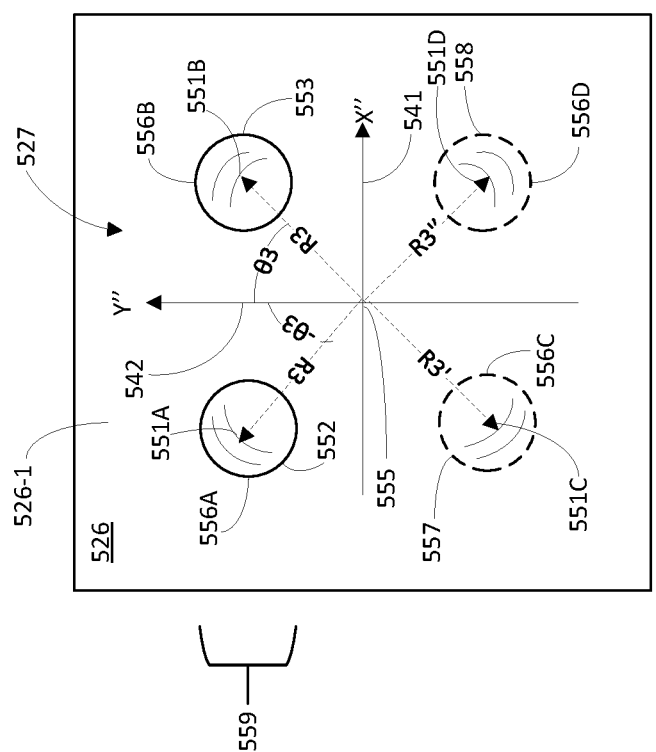
FIG. 5 illustrates a diagram of an optical detector upon which a total optical interference pattern is projected.

FIG. 5 illustrates a diagram of an optical detector 526 upon which a total optical interference pattern 527 is projected onto a surface 526-1 of the optical detector 526. A plane of the surface 526-1 is defined by a seventh axis (X") 542 and an eighth axis (Y") 543 which are orthogonal to one another.

For pedagogical purposes, the illustrated total optical interference pattern 527 includes only one pair 559 of a received optical interference pattern 552 and a reference optical interference pattern 553 in the illustrated locations; for the single pair, positions of the received optical interference pattern 552 and the reference optical interference pattern 553 can be reversed. The received optical interference pattern 552 is created from the first received optical signal 106-1 and by the optical interferometer 221. The reference optical interference pattern 553 is created from the first reference optical signal REF1 and by the optical interferometer 221.

Positions of the received optical interference pattern 552, a reference optical interference pattern 553, and corresponding undesired interference patterns and their shapes are described below in a specific manner. However, such description is for pedagogical purposes. The shapes may differ. The positions may be described in alternative ways and positions reversed as described elsewhere herein.

The received optical interference pattern 552 and the reference optical interference pattern 553 are each displaced substantially symmetrically about the eighth axis 542. This is because a received optical emitter and a reference optical emitter, which respectively emit the received optical signal 106-1 and the reference optical signal REF1, are symmetrically disposed around the eighth axis 542, e.g., in a manner described above. The seventh axis 541 and the eighth axis 542 intersect at the intersection 555[4]. The received optical interference pattern 552 has a center 551A which is at a radius R3 from the intersection 555 and is disposed at a negative third angle $-\theta 3$. The reference optical interference pattern 553 has a center 551B which is at a radius R3 from the intersection 555 and is disposed at a third angle $\theta 3$.

[4] The seventh axis 541 and the eighth axis 542 intersect at an intersection 555 such that the first axis 541 symmetrically divides the surface 526-1 of the optical detector 526 along the seventh axis 541 and the eighth axis 542 symmetrically divides a surface 526-1 of the optical detector 526 along the second axis 542. A ninth axis, e.g., the Z axis, is orthogonal to each of the seventh axis 541 and the eighth axis 542.

The optical interferometer system 201-4 can suffer another problem: reflections between surfaces of components, e.g., between a surface of a lens and a surface of the optical interferometer 221, which cause a first undesired optical interference pattern 557 and/or a second undesired optical interference pattern 558 (which also may be referred to individually or collectively as 'Ghost" optical interference pattern(s)). If an undesired optical interference pattern overlaps a desired, i.e., a received or reference, interference pattern, then this can induce further error, e.g., in measurement of velocity by the LIDAR system 101.

The first undesired optical interference pattern 557 is generated from the first reference optical signal REF1 which is used to create the reference optical interference pattern 553. The second undesired optical interference pattern 558 is generated from the first received optical signal 106-1 which is used to create the received optical interference pattern 552.

The first undesired optical interference pattern 557 has a center 551C. The center 551C of the first undesired optical interference pattern 557 (a) occurs one hundred and eighty degrees around the intersection 555 from the center 551B of the reference optical interference pattern 553 and (b) a radial distance R3' from the center 551C of the first undesired optical interference pattern 557 is substantially the same as the radial distance R3 from the center 551B of the reference optical interference pattern 553.

The second undesired optical interference pattern 558 has a center 551D. The center 551D of the second undesired optical interference pattern 558 (a) occurs one hundred and eighty degrees around the intersection 555 from the center 551A of the received optical interference pattern 552 and (b) a radial distance R3" from the center 551D of the second undesired optical interference pattern is substantially the same as the radial distance R3 from the center 551A of the received optical interference pattern 552.

Each received optical interference pattern has a cross-sectional area. Each reference optical interference pattern has a cross-sectional area. The illustrated received optical interference pattern 552 has a first cross-sectional area 556A. The illustrated reference optical interference pattern 553 has a second cross-sectional area 556B.

Each undesired optical interference pattern has a cross-sectional area. The first undesired optical interference pattern 557 has a third cross-sectional area 556C. The second undesired optical interference pattern 558 has a fourth cross-sectional area 556D. To diminish error arising from the undesired optical interference pattern and when more than one pair of a received optical emitter and a reference optical emitter (i.e., N is greater than one), then no received optical interference pattern or reference optical interference pattern should overlap an undesired optical interference pattern.

A cross-sectional area of a received optical interference pattern is proportional to a cross-sectional area of the cross-sectional area of a received optical emitter which emits a received optical signal from which the optical interferometer 221 generates the received optical interference pattern 552. A cross-sectional area of a reference optical interference pattern is proportional to a cross-sectional area of the cross-sectional area of a reference optical emitter which emits a reference optical signal from which the optical interferometer 221 generates the reference optical interference pattern 553.

Figure 6:
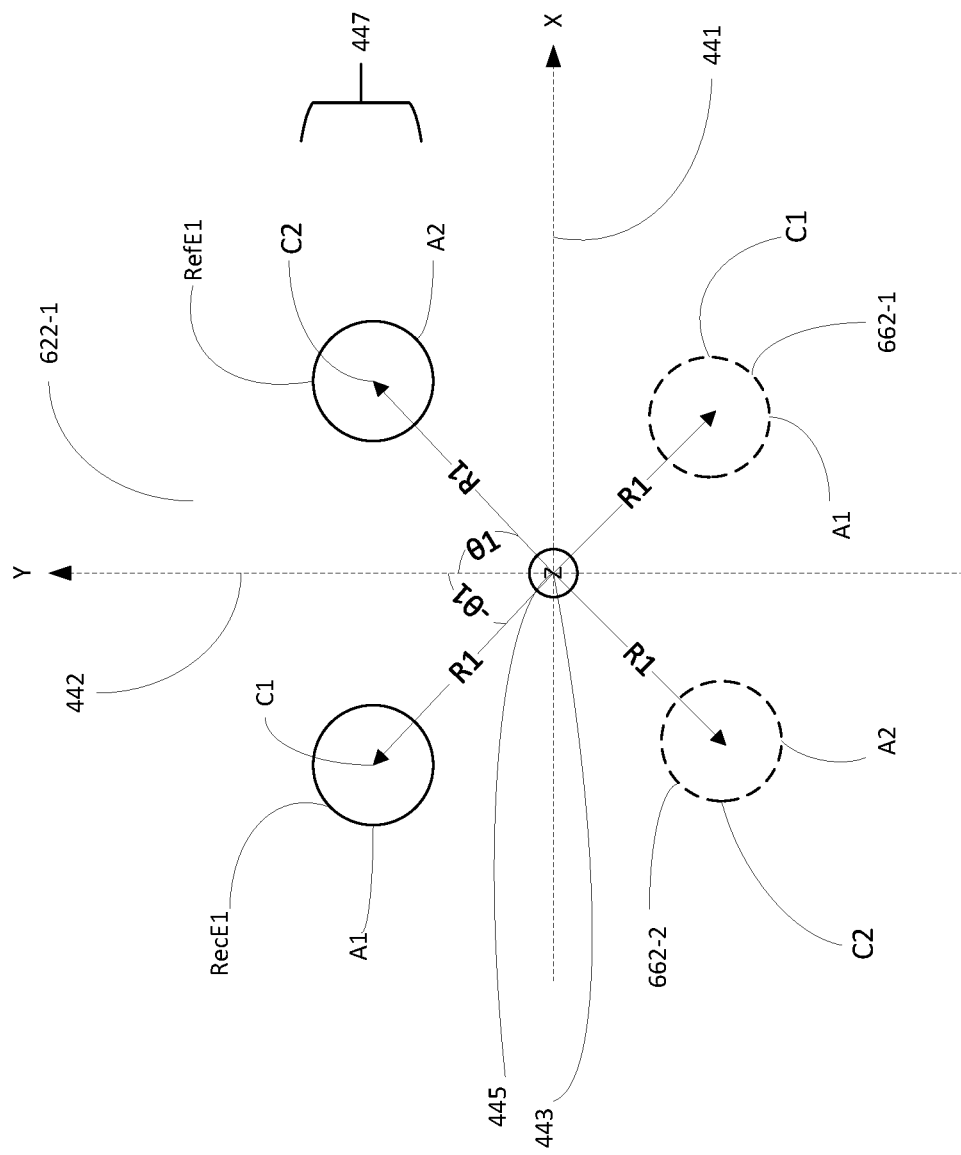
FIG. 6 illustrates one embodiment of a surface, of the ferrule, with an exemplary pair of a first received optical signal emitter and a first reference optical signal emitter and a cross-section of each emitter's mirror image.

To avoid potential errors due to undesired interference pattern(s) in a system with a ferrule 222 with two or more pairs of received optical signal and reference optical signal emitters (i.e., N is greater than one), no received optical emitter or reference optical emitter should be located in the surface 222-1 of the ferrule 222 in a cross-section of a mirror image of another received or reference optical emitter in the ferrule 222, e.g., in the surface 222-1. FIG. 6 illustrates this point.

FIG. 6 illustrates one embodiment of a surface 622-1, of the ferrule 222, with an exemplary pair of a first received optical signal emitter RecE1 and a first reference optical signal emitter RefE1 and a cross-section of each emitter's mirror image (around the fourth and fifth axes 441, 442). Reference numbers which are the same or similar to those used in FIG. 4 have the same meaning in FIG. 6.

The cross-section C1 of a mirror image 662-1 (around the fourth and fifth axes 441, 442) of the first received optical signal emitter RecE1 occurs one hundred and eighty degrees around the intersection 445 from the center point C1 of the first received optical signal emitter RecE1. The cross-section C1 of a mirror image 662-1 of the first received optical signal emitter RecE1 has the same cross-sectional area A1 as the cross-sectional area A1 of the first received optical signal emitter RecE1.

The cross-section C2 of a mirror image 662-2 (around the fourth and fifth axes 441, 442) of the first reference optical signal emitter RefE1 occurs one hundred and eighty degrees around the intersection 445 from the center point C2 of the first reference optical signal emitter RefE1. The cross-section C2 of a mirror image 662-2 of the first reference optical signal emitter RefE1 has the same cross-sectional area A2 as the cross-sectional area A2 of the first reference optical signal emitter RefE1. If the ferrule 222 includes additional pairs, i.e., more than one pair or N is greater than one, of a unique received optical signal emitter and a unique reference optical signal emitter, then no cross-section of any emitter's should overlap a mirror image of any other emitter.

For purposes of clarity, an emitter E1-1, E1-2, E2-1, E2-2 in a corresponding quadrant of the surface 222-1, 422-1 of the ferrule 222 generates a corresponding interference pattern in a different quadrant in the surface 226-1, 526-1 of the optical detector 226 which is one hundred and eighty degrees from the quadrant of the surface 222-1, 622-1 of the ferrule 222.

Figure 7:
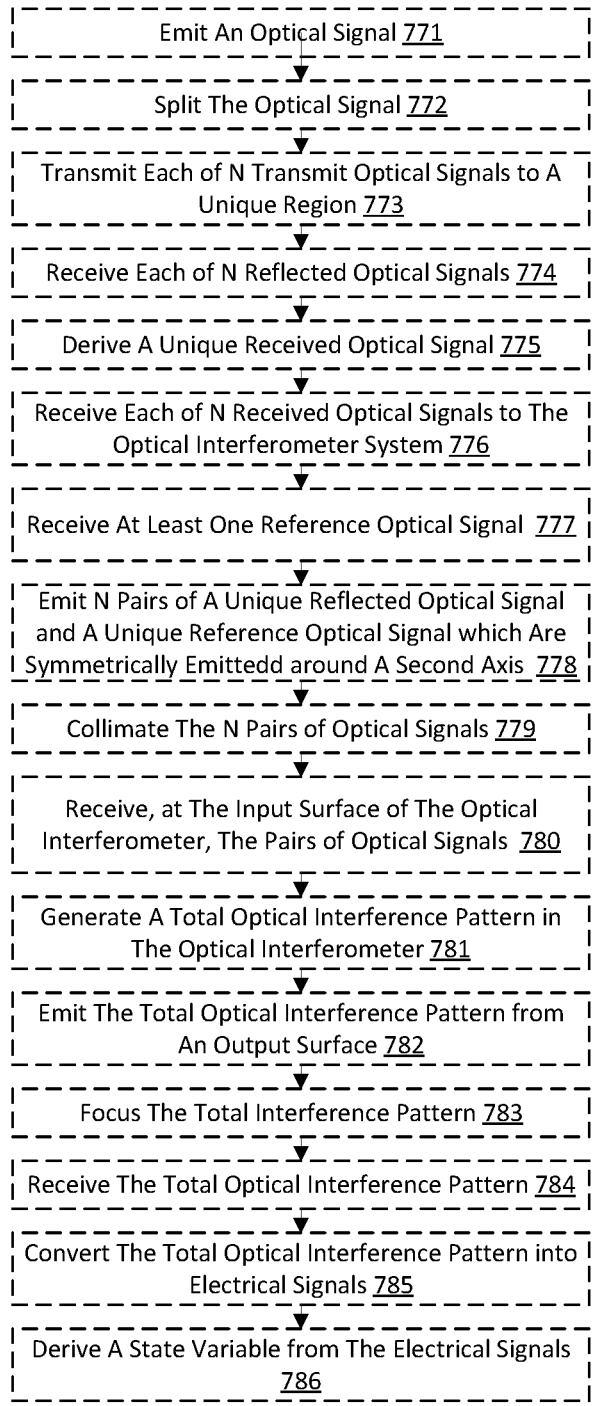
FIG. 7 illustrates a flow diagram of an exemplary method for transmitting optical signals from a surface of a ferrule according to embodiments of the invention.

FIG. 7 illustrates a flow diagram of an exemplary method 770 for transmitting optical signals from a surface of a ferrule to an input surface, of an optical interferometer, which is tilted around a first (e.g., X) axis and offset at a first angle with respect to a second (e.g., Y) axis which is orthogonal to the first axis. The optical interferometer has an output surface which is also tilted around the first axis and offset at a second angle with respect to the second axis. The tilt of surfaces and axes of components of the optical interferometer is further described herein with respect to FIGS. 2 and 3. The optical signals are configured to propagate in a third (e.g., Z) axis which is orthogonal to each of the first and the second axes.

The optical interferometer is an optical interferometer including the first piece of optically clear material separated by a third piece of optically clear material (e.g., air) from a second piece of optically clear material and having at least one of (a) the input surface of the first piece of optically clear material is tilted around a first (e.g., X) axis and offset at angle δ with respect to a second (e.g., Y) axis which is orthogonal to the first axis and (b) the output surface of the second piece of optically clear material is tilted around the first (e.g., X) axis and offset at angle β with respect to the second (e.g., Y) axis which is orthogonal to the first axis. Optionally, offset angle δ is equal to offset angle β, however such offset angles may differ. The first and the second axes are each orthogonal to a third (e.g., Z) along which or parallel to which the received and reference optical signals and the optical interference pattern (and its constituent components) propagate. Optionally, the optical interferometer is a Fabry-Perot interferometer.

Exemplary method 770 may be implemented by one or more of the apparatuses illustrated in FIGS. 1-6. To the extent the methods herein are described herein as being implemented with one or more of the apparatuses illustrated in FIGS. 1-6, it is to be understood that other embodiments can be implemented in other ways. Techniques described with respect to the embodiments illustrated by FIGS. 1-6 may be applicable to the method 770.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In optional block 771, an optical signal is emitted, e.g., by a laser. In optional block 772, the optical signal is split, e.g., by an optical splitter, into N transmission optical signals and M reference optical signals. Integers M and N are defined and exemplified elsewhere herein.

In optional block 773, using the N transmission optical signals, each of N transmitted optical signals are transmitted, e.g., from a unique transmitting optical component, towards a unique region, e.g., of gas, solid, and/or liquid. A portion of each transmitted optical signal, a reflected optical signal, is reflected back to and received by the LIDAR system, e.g., to a unique receiving optical component. Thus, in optional block 774, each of N reflected optical signals are received from a unique region, e.g., by the unique receiving optical component.

In optional block 775, a unique received optical signal is derived, e.g., by the LIDAR system (for example by the unique receiving optical component), from each reflected optical signal. In optional block 776, each of N received optical signals is received, e.g., by the optical interferometer system, for example, the ferrule therein.

In block 777, at least one reference optical signal is received. Optionally, the M reference optical signals are received, e.g., by the optical interferometer system, for example, the ferrule therein. Optionally, if less than O reference optical signals are received, then the at least one reference optical signal is split so that O reference optical signals are provided. When O is greater than N, then the extra reference optical signals in excess of N reference optical signals may be used for other purposes, e.g. in the optical interferometer system 101-4.

In block 778, emitting N pairs of a unique reflected optical signal and a unique reference optical signal. Each pair of the N pairs includes a unique reflected optical signal (of the N reflected optical signals) and a unique reference optical signal (of the N reflected optical signals) whose cross-sections are symmetrically emitted around the fifth axis; optionally, such optical signals have the same cross-section. Optionally, symmetrical emission of cross-sections of a unique reflected optical signal and a unique reference optical signal around the fifth axis means that:

(a) a center of a cross-section of the unique reflected optical signal, is disposed at a negative first angle −θ1 from the fifth axis and at a first radius R1 from an intersection of the fourth and fifth axes; and (b) a center of a cross-section of the unique reference optical signal, is disposed at a first angle θ1 from the fifth axis and at the first radius R1 from the intersection of the fourth and fifth.

Optionally, if the ferrule includes more than one pair of a received optical signal emitter and a reference optical signal emitter (i.e., N is greater than one), then no cross-section of any emitted optical signal should overlap a mirror image of any other emitted optical signal; this topic is further illustrated elsewhere herein with respect to optical emitters.

In optional block 779, the emitted N pairs of reflected optical signals and reference optical signals are collimated, e.g., by at least one collimating lens. In optional block 780, the emitted N pairs of reflected optical signals and reference optical signals are received by the input surface of the optical interferometer. Exemplary structure and operation of an optical interferometer is described elsewhere herein.

In optional block 781, using the received emitted N pairs, a total optical interference pattern is generated in the optical interferometer. The total optical interference pattern is further described elsewhere herein.

In block 782, the total optical interference pattern is emitted by the output surface of the optical interferometer. In optional block 783, the total optical interference pattern is focused, e.g., by at least one imaging lens and on the optical sensor. In optional block 784, the total optical interference pattern is received, e.g., by the optical sensor. In optional block 785, the total optical interference pattern is converted, e.g., by the optical sensor, into electrical signals conveying information about (or representative of) the total optical interference pattern. In optional block 786, a state variable, e.g., a vector velocity, (of a vehicle in which the LIDAR system is mounted) is derived, e.g., by the processing system, from the electrical signals representing the total optical interference pattern. Optionally, the electrical signals, e.g., information related to optical intensity, are also used to adjust an output power and/or optical pulse transmission times, e.g., of the laser.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an apparatus for transmitting optical signals to an input surface of an optical interferometer, wherein the optical interferometer further comprises an output surface, wherein the input surface is tilted around a first axis and offset at a first angle with respect to a second axis which is orthogonal to the first axis, wherein the output surface is tilted around the first axis and offset at a second angle with respect to the second axis which is orthogonal to the first axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the apparatus comprising: a ferrule; N pairs of optical emitters in a surface of the ferrule, wherein each pair of optical emitters comprises a received optical emitter configured to emit to the input surface a received optical signal and a reference optical emitter configured to emit to the input surface a reference optical signal, wherein N is an integer greater than zero; wherein the surface of the ferrule is in a plane formed by a fourth and a fifth axis which are orthogonal to one another; and wherein cross-sections of the optical emitters of each pair are symmetrically disposed around the fifth axis; wherein, for each pair, the received optical emitter is in a half of the plane divided by the fifth axis and the reference optical emitter is in another half of the plane.

Example 2 includes the apparatus of Example 1, wherein N is an integer greater than two.

Example 3 includes the apparatus of any of Examples 1-2, wherein symmetrically disposing cross-sections of the optical emitters of each pair around the fifth axis means that a center of the received optical emitter of a pair is disposed at a negative third angle from the fifth axis and at a radius from an intersection between the fourth and the fifth axes and that a center of the reference optical emitter of the pair is disposed at the third angle from the fifth axis and at the radius from the intersection.

Example 4 includes the apparatus of any of Examples 1-3, wherein when N is greater than one, then no optical emitter is located in the surface in a cross-sectional area of a mirror image, around the fourth and the fifth axes, of another optical emitter in the surface.

Example 5 includes the apparatus of Example 4, wherein a center of the cross-sectional area of the mirror image is located one hundred and eighty degrees around an intersection of the fourth and the fifth axes and at a same radial distance from the intersection that a center of a cross-sectional area of the other optical emitter is from the intersection.

Example 6 includes the apparatus of any of Examples 1-5, further comprising: at least one collimating lens configured to collimate the N pairs of optical signals emitted from the ferrule; the optical interferometer configured to receive the N pairs of the optical signals at the input surface, generate an interference pattern from each received optical signal and each reference optical signal received from the ferrule, and to emit interference patterns from the output surface; at least one imaging lens configured to focus the interference patterns emitted from the output surface; and an optical detector configured to convert the interference patterns to electrical signals.

Example 7 includes the apparatus of Example 6, wherein the optical interferometer is a Fabry-Perot interferometer.

Example 8 includes the apparatus of any of Examples 6-7, further comprising: a laser configured to emit a laser optical signal; an optical splitter configured to split the laser optical signal into N transmission optical signals and M reference optical signals, wherein M is an integer less than or equal to O, and wherein O is an integer greater than or equal to N; and N pairs of optical transmitters and optical receivers, wherein each optical transmitter is configured, using the N transmission optical signals, to transmit one of N transmit optical signals to a region comprising at least one of: at least one gas, at least one solid, and at least one liquid, wherein each optical receiver is configured to receive a one of N reflected optical signals reflected from a respective region and generate a receive optical signal therefrom; wherein the ferrule is configured to receive N received optical signals from N optical receivers and M reference signals from the optical splitter; processing circuitry configured to receive the electrical signals, and using the electrical signals, determine a state variable of a vehicle on or in which the N pairs of optical transmitters and optical receivers are mounted.

Example 9 includes the apparatus of Example 8, wherein M is less than N; wherein the ferrule is configured to split the M reference signals into O reference signals.

Example 10 includes a method for transmitting optical signals to an input surface of an optical interferometer, wherein the optical interferometer further comprises an output surface, wherein the input surface is tilted around a first axis offset at a first angle with respect to a second axis which is orthogonal to the first axis, wherein the output surface is tilted around the first axis offset at a second angle with respect to the second axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the method comprising: receiving N received optical signals, wherein N is an integer greater than or equal to one; receiving M reference optical signals, wherein M is an integer less than or equal to O, and wherein O is an integer greater than or equal to N; and emitting N pairs of a received optical signal and a reference optical signal, wherein cross-sections of optical signals of each pair of the N pairs are symmetrically emitted around a fifth axis of a plane in which each emitter is located and which is defined by a fourth axis and the fifth axis that are orthogonal to one another.

Example 11 includes the method of Example 10, wherein symmetrically disposing each pair around the fifth axis means that a center of a received optical signal of a pair is disposed at a negative third angle from the fifth axis and at a radius from an intersection between the fourth and the fifth axes and that a center of a reference optical signal of the pair is disposed at a third angle from the fifth axis and at the radius from the intersection.

Example 12 includes the method of any of Examples 10-11, wherein when N is greater than one, then no cross-section of any emitted optical signal of the N pairs should overlap a mirror image, around the fourth and the fifth axes, of any other emitted optical signal of the N pairs.

Example 13 includes the method of any of Examples 10-12, wherein when N is greater than two.

Example 14 includes the method of any of Examples 10-13, further comprising: collimating the emitted N pairs of a received optical signal and a reference optical signal; receiving the emitted N pairs of a received optical signal and a reference optical signal at the input surface of the optical interferometer; using the received emitted N pairs, generating a total optical interference pattern comprising an interference pattern for each reflected optical signal and for each reference optical signal received by the input surface; emitting the total optical interference pattern from the output surface; focusing the emitted total optical interference pattern; and generating electrical signals representative of the total optical interference pattern.

Example 15 includes the method of Example 14, further comprising: emitting an optical signal; splitting the optical signal into N transmission optical signals and M reference optical signals; transmitting each of the N transmitted optical signals to a region comprising at least one of: at least one gas, at least one solid, and at least one liquid; receiving a N reflected optical signals, wherein each reflected optical signal is a portion of a transmitted optical signal reflected from a respective region; deriving the N received optical signals each of which is derived from a reflected optical signal; and determining a state variable of a vehicle from the electrical signals.

Example 16 includes the method of any of Examples 10-15, wherein when M does not equal N, then generating O reference optical signals from the M reference optical signals.

Example 17 includes an apparatus for transmitting optical signals to an input surface, of a Fabry-Perot etalon, which is tilted around a first axis and offset at a first angle with respect to a second axis which is orthogonal to the first axis, wherein optical signal is configured to propagate in a third axis, orthogonal to each of the first and the second axes, to the input surface of the Fabry-Perot etalon, the apparatus comprising: a first set of N optical emitters each of which emit a reflected optical signal from a ferrule surface, wherein N is an integer greater than zero; a second set of O optical emitters each of which emit a reference optical signal from the ferrule surface, wherein O is an integer greater than or equal to N; and wherein the ferrule surface is in a plane formed by fourth and fifth axes; wherein a position of each pair of an optical emitter of the first set and an optical emitter of the second set are symmetrically disposed around the fifth axis.

Example 18 includes the apparatus of Example 17, wherein symmetrically disposing each pair around the fifth axis means that a center of a received optical emitter of a pair is disposed at a negative second angle from the fifth axis and at a radius from an intersection between the fourth and the fifth axes and that a center of a reference optical emitter of the pair is disposed at a second angle from the fifth axis and at the radius from the intersection.

Example 19 includes the apparatus of any of Examples 17-18, wherein when N is greater than one, then no optical emitter is located in the ferrule surface in a cross-sectional area of a mirror image, around the fourth and the fifth axes, of another optical emitter in the ferrule surface.

Example 20 includes the apparatus of Example 19, wherein a center of a cross-sectional area of the mirror image is located one hundred and eighty degrees around an intersection of the fourth and the fifth axes and at a same radial distance from the intersection that a center of a cross-sectional area of the other optical emitter is from the intersection.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus for transmitting optical signals to an input surface of an optical interferometer, wherein the optical interferometer further comprises an output surface, wherein the input surface is tilted around a first axis and offset at a first angle with respect to a second axis which is orthogonal to the first axis, wherein the output surface is tilted around the first axis and offset at a second angle with respect to the second axis which is orthogonal to the first axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the apparatus comprising:
   a ferrule;
   N pairs of optical emitters in a surface of the ferrule, wherein each pair of optical emitters comprises a received optical emitter configured to emit to the input surface a received optical signal and a reference optical emitter configured to emit to the input surface a reference optical signal, wherein N is an integer greater than zero;
   wherein the surface of the ferrule is in a plane formed by a fourth and a fifth axis which are orthogonal to one another; and
   wherein cross-sections of the optical emitters of each pair are symmetrically disposed around the fifth axis;
   wherein, for each pair, the received optical emitter is in a half of the plane divided by the fifth axis and the reference optical emitter is in another half of the plane.

2. The apparatus of claim 1, wherein N is an integer greater than two.

3. The apparatus of claim 1, wherein symmetrically disposing cross-sections of the optical emitters of each pair around the fifth axis means that a center of the received optical emitter of a pair is disposed at a negative third angle from the fifth axis and at a radius from an intersection between the fourth and the fifth axes and that a center of the reference optical emitter of the pair is disposed at the third angle from the fifth axis and at the radius from the intersection.

4. The apparatus of claim 1, wherein when N is greater than one, then no optical emitter is located in the surface in a cross-sectional area of a mirror image, around the fourth and the fifth axes, of another optical emitter in the surface.

5. The apparatus of claim 4, wherein a center of the cross-sectional area of the mirror image is located one hundred and eighty degrees around an intersection of the fourth and the fifth axes and at a same radial distance from the intersection that a center of a cross-sectional area of the other optical emitter is from the intersection.

6. The apparatus of claim 1, further comprising:
   at least one collimating lens configured to collimate the N pairs of optical signals emitted from the ferrule;
   the optical interferometer configured to receive the N pairs of the optical signals at the input surface, generate an interference pattern from each received optical signal and each reference optical signal received from the ferrule, and to emit interference patterns from the output surface;
   at least one imaging lens configured to focus the interference patterns emitted from the output surface; and
   an optical detector configured to convert the interference patterns to electrical signals.

7. The apparatus of claim 6, wherein the optical interferometer is a Fabry-Perot interferometer.

8. The apparatus of claim 6, further comprising:
   a laser configured to emit a laser optical signal;
   an optical splitter configured to split the laser optical signal into N transmission optical signals and M reference optical signals, wherein M is an integer less than or equal to O, and wherein O is an integer greater than or equal to N; and
   N pairs of optical transmitters and optical receivers, wherein each optical transmitter is configured, using the N transmission optical signals, to transmit one of N transmit optical signals to a region comprising at least one of: at least one gas, at least one solid, and at least one liquid, wherein each optical receiver is configured to receive a one of N reflected optical signals reflected from a respective region and generate a receive optical signal therefrom;

wherein the ferrule is configured to receive N received optical signals from N optical receivers and M reference signals from the optical splitter;

processing circuitry configured to receive the electrical signals, and using the electrical signals, determine a state variable of a vehicle on or in which the N pairs of optical transmitters and optical receivers are mounted.

9. The apparatus of claim 8, wherein M is less than N; wherein the ferrule is configured to split the M reference signals into O reference signals.

10. A method for transmitting optical signals to an input surface of an optical interferometer, wherein the optical interferometer further comprises an output surface, wherein the input surface is tilted around a first axis offset at a first angle with respect to a second axis which is orthogonal to the first axis, wherein the output surface is tilted around the first axis offset at a second angle with respect to the second axis, wherein optical signal is configured to propagate towards the input surface in a third axis which is orthogonal to the first and the second axes, wherein the input surface is on a first optically clear material, the output surface is on a second optically clear material, and wherein the first and the second optically clear materials are separated from one another, the method comprising:

receiving N received optical signals, wherein N is an integer greater than or equal to one;

receiving M reference optical signals, wherein M is an integer less than or equal to O, and wherein O is an integer greater than or equal to N; and emitting N pairs of a received optical signal and a reference optical signal, wherein cross-sections of optical signals of each pair of the N pairs are symmetrically emitted around a fifth axis of a plane in which each emitter is located and which is defined by a fourth axis and the fifth axis that are orthogonal to one another.

11. The method of claim 10, wherein symmetrically disposing each pair around the fifth axis means that a center of a received optical signal of a pair is disposed at a negative third angle from the fifth axis and at a radius from an intersection between the fourth and the fifth axes and that a center of a reference optical signal of the pair is disposed at a third angle from the fifth axis and at the radius from the intersection.

12. The method of claim 10, wherein when N is greater than one, then no cross-section of any emitted optical signal of the N pairs should overlap a mirror image, around the fourth and the fifth axes, of any other emitted optical signal of the N pairs.

13. The method of claim 10, wherein when N is greater than two.

14. The method of claim 10, further comprising:

collimating the emitted N pairs of a received optical signal and a reference optical signal;

receiving the emitted N pairs of a received optical signal and a reference optical signal at the input surface of the optical interferometer;

using the received emitted N pairs, generating a total optical interference pattern comprising an interference pattern for each reflected optical signal and for each reference optical signal received by the input surface;

emitting the total optical interference pattern from the output surface;

focusing the emitted total optical interference pattern; and generating electrical signals representative of the total optical interference pattern.

15. The method of claim 14, further comprising:

emitting an optical signal;

splitting the optical signal into N transmission optical signals and M reference optical signals;

transmitting each of the N transmitted optical signals to a region comprising at least one of: at least one gas, at least one solid, and at least one liquid;

receiving a N reflected optical signals, wherein each reflected optical signal is a portion of a transmitted optical signal reflected from a respective region;

deriving the N received optical signals each of which is derived from a reflected optical signal; and determining a state variable of a vehicle from the electrical signals.

16. The method of claim 10, wherein when M does not equal N, then generating O reference optical signals from the M reference optical signals.

17. An apparatus for transmitting optical signals to an input surface, of a Fabry-Perot etalon, which is tilted around a first axis and offset at a first angle with respect to a second axis which is orthogonal to the first axis, wherein optical signal is configured to propagate in a third axis, orthogonal to each of the first and the second axes, to the input surface of the Fabry-Perot etalon, the apparatus comprising:

a first set of N optical emitters each of which emit a reflected optical signal from a ferrule surface, wherein N is an integer greater than zero;

a second set of O optical emitters each of which emit a reference optical signal from the ferrule surface, wherein O is an integer greater than or equal to N; and wherein the ferrule surface is in a plane formed by fourth and fifth axes;

wherein a position of each pair of an optical emitter of the first set and an optical emitter of the second set are symmetrically disposed around the fifth axis.

18. The apparatus of claim 17, wherein symmetrically disposing each pair around the fifth axis means that a center of a received optical emitter of a pair is disposed at a negative second angle from the fifth axis and at a radius from an intersection between the fourth and the fifth axes and that a center of a reference optical emitter of the pair is disposed at a second angle from the fifth axis and at the radius from the intersection.

19. The apparatus of claim 17, wherein when N is greater than one, then no optical emitter is located in the ferrule surface in a cross-sectional area of a mirror image, around the fourth and the fifth axes, of another optical emitter in the ferrule surface.

20. The apparatus of claim 19, wherein a center of a cross-sectional area of the mirror image is located one hundred and eighty degrees around an intersection of the fourth and the fifth axes and at a same radial distance from the intersection that a center of a cross-sectional area of the other optical emitter is from the intersection.

* * * * *